US009863510B2

(12) United States Patent
Satomura et al.

(10) Patent No.: US 9,863,510 B2
(45) Date of Patent: Jan. 9, 2018

(54) HYDRAULIC AUTO-TENSIONER

(71) Applicants: Aisaku Satomura, Shizuoka (JP); Tadahisa Tanaka, Shizuoka (JP)

(72) Inventors: Aisaku Satomura, Shizuoka (JP); Tadahisa Tanaka, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/098,757

(22) Filed: Apr. 14, 2016

(65) Prior Publication Data

US 2016/0230852 A1    Aug. 11, 2016

Related U.S. Application Data

(63) Continuation of application No. 14/113,043, filed as application No. PCT/JP2012/059974 on Apr. 12, 2012, now Pat. No. 9,423,009.

(30) Foreign Application Priority Data

Apr. 21, 2011  (JP) ................................. 2011-094787
May 19, 2011  (JP) ................................. 2011-112214
Jun. 6, 2011   (JP) ................................. 2011-125995

(51) Int. Cl.
*F16H 7/22*   (2006.01)
*F16H 7/08*   (2006.01)
*F16H 7/12*   (2006.01)

(52) U.S. Cl.
CPC ............. *F16H 7/12* (2013.01); *F16H 7/1236* (2013.01); *F16H 7/0836* (2013.01);
(Continued)

(58) Field of Classification Search
CPC ..... F16H 2007/0806; F16H 2007/0859; F16H 7/0848; F16H 2007/0891; F16H 7/0836
(Continued)

(56) References Cited

U.S. PATENT DOCUMENTS 4,790,801 A * 12/1988 Schmidt ................ F16H 7/1236
                                                474/110
4,911,679 A *  3/1990 Inoue .................... F16H 7/1236
                                                474/110
(Continued)

FOREIGN PATENT DOCUMENTS

EP    2 267 335      12/2010
JP    02-066352      3/1990
(Continued)

OTHER PUBLICATIONS

International Search Report dated Jul. 3, 2012 in International (PCT) Application No. PCT/JP2012/059974 with English translation.

(Continued)

*Primary Examiner* — Henry Liu
(74) *Attorney, Agent, or Firm* — Wenderoth, Lind & Ponack, L.L.P.

(57) ABSTRACT

A hydraulic auto-tensioner includes a cylinder with a sleeve fitting hole, and a sleeve press-fitted therein. A rod has its bottom end slidable in the sleeve. A return spring is mounted between a spring seat at an upper portion of the rod and a bottom surface of the cylinder. An oil passage, with a check valve, is formed between the fitting surfaces of the sleeve fitting hole and the sleeve and communicates the pressure chamber with the reservoir chamber. The rod has a valve fitting hole open to its bottom surface, and an oil passage communicating the valve fitting hole with the reservoir chamber. A relief valve, mounted in the valve fitting hole, includes a valve seat with a valve hole having an orifice for restricting the flow rate of oil released from the pressure chamber into the reservoir chamber through the oil passage when the relief valve opens.

16 Claims, 13 Drawing Sheets

(52) U.S. Cl.
CPC ............... *F16H 2007/0806* (2013.01); *F16H 2007/0814* (2013.01); *F16H 2007/0859* (2013.01); *F16H 2007/0893* (2013.01)

(58) Field of Classification Search
USPC ........................................................ 474/110
See application file for complete search history.

(56) References Cited

U.S. PATENT DOCUMENTS

| | | | | |
|---|---|---|---|---|
| 4,934,984 | A * | 6/1990 | Ojima | F16H 7/08 474/111 |
| 4,950,209 | A * | 8/1990 | Kawashima | F16H 7/1236 474/110 |
| 4,997,410 | A * | 3/1991 | Polster | F16H 7/0836 474/110 |
| 5,026,330 | A * | 6/1991 | Zermati | F16H 7/1236 474/110 |
| 5,116,284 | A * | 5/1992 | Cho | F16H 7/1236 474/110 |
| 5,709,625 | A * | 1/1998 | Nakakubo | F01L 1/02 474/110 |
| 5,785,345 | A * | 7/1998 | Barlas | B60G 11/465 280/124.116 |
| 6,036,612 | A * | 3/2000 | Katogi | F16H 7/0848 474/101 |
| 6,106,424 | A * | 8/2000 | Kratz | F16H 7/0836 474/110 |
| 6,149,832 | A * | 11/2000 | Foister | H01F 1/447 252/62.51 R |
| 6,203,461 | B1 * | 3/2001 | Watanabe | F16H 7/0848 474/110 |
| 6,234,929 | B1 * | 5/2001 | Rasche | F16H 7/0836 474/110 |
| 6,945,889 | B2 * | 9/2005 | Markley | F16H 7/0848 474/109 |
| 7,094,168 | B2 * | 8/2006 | Tanaka | F16H 7/0836 474/109 |
| 7,108,621 | B2 * | 9/2006 | Ullein | F16H 7/0836 474/101 |
| 7,241,239 | B2 * | 7/2007 | Tanaka | F16H 7/0836 474/101 |
| 7,686,717 | B2 | 3/2010 | Grunau | |
| 8,100,792 | B2 | 1/2012 | Kawahara | |
| 2004/0000873 | A1 * | 1/2004 | Moon | H01J 9/242 313/587 |
| 2004/0067806 | A1 * | 4/2004 | Markley | F16H 7/0848 474/110 |
| 2004/0087398 | A1 | 5/2004 | Tanaka | |
| 2005/0064970 | A1 * | 3/2005 | Tanaka | F16H 7/0836 474/110 |
| 2005/0130777 | A1 * | 6/2005 | Grunau | F16H 7/0848 474/110 |
| 2006/0008922 | A1 * | 1/2006 | Chace | G01N 33/6848 436/518 |
| 2006/0089221 | A1 | 4/2006 | Hashimoto | |
| 2007/0082773 | A1 * | 4/2007 | Yamada | F16H 7/0848 474/109 |
| 2007/0252104 | A1 | 11/2007 | Bose | |
| 2007/0259792 | A1 * | 11/2007 | Null | C10M 105/04 508/583 |
| 2008/0020876 | A1 | 1/2008 | Tanaka | |
| 2009/0005274 | A1 | 1/2009 | Swartele | |
| 2009/0215563 | A1 * | 8/2009 | Sauermann | F16H 7/1281 474/135 |
| 2009/0286637 | A1 | 11/2009 | Stief | |
| 2010/0093474 | A1 | 4/2010 | Onimaru | |
| 2010/0105506 | A1 | 4/2010 | Rointru | |
| 2010/0120564 | A1 | 5/2010 | Hartmann | |
| 2010/0267503 | A1 | 10/2010 | Hartmann | |
| 2011/0207567 | A1 | 8/2011 | Kaiser | |
| 2013/0303318 | A1 | 11/2013 | Hofmann | |
| 2014/0057748 | A1 * | 2/2014 | Satomura | F16H 7/1236 474/110 |

FOREIGN PATENT DOCUMENTS

| | | |
|---|---|---|
| JP | 10-306859 | 11/1998 |
| JP | 11-336855 | 12/1999 |
| JP | 2000-504395 | 4/2000 |
| JP | 2001-165251 | 6/2001 |
| JP | 2001-227603 | 8/2001 |
| JP | 2002-188697 | 7/2002 |
| JP | 2002-333056 | 11/2002 |
| JP | 2004-225836 | 8/2004 |
| JP | 2007-016938 | 1/2007 |
| JP | 2007-100728 | 4/2007 |
| JP | 2008-196507 | 8/2008 |
| JP | 2009-191863 | 8/2009 |
| JP | 2009-264419 | 11/2009 |
| JP | 2009-275756 | 11/2009 |
| JP | 2010-286090 | 12/2010 |
| JP | 2011-027238 | 2/2011 |

OTHER PUBLICATIONS

Written Opinion of the International Searching Authority dated Jul. 3, 2012 in International (PCT) Application No. PCT/JP2012/059974 with English translation.

Japanese Office Action dated Feb. 17, 2015 in corresponding Japanese Application No. 2011-094787 (with partial English translation).

Japanese Office Action dated Feb. 10, 2015 in corresponding Japanese Application No. 2011-112214 (with English translation).

\* cited by examiner

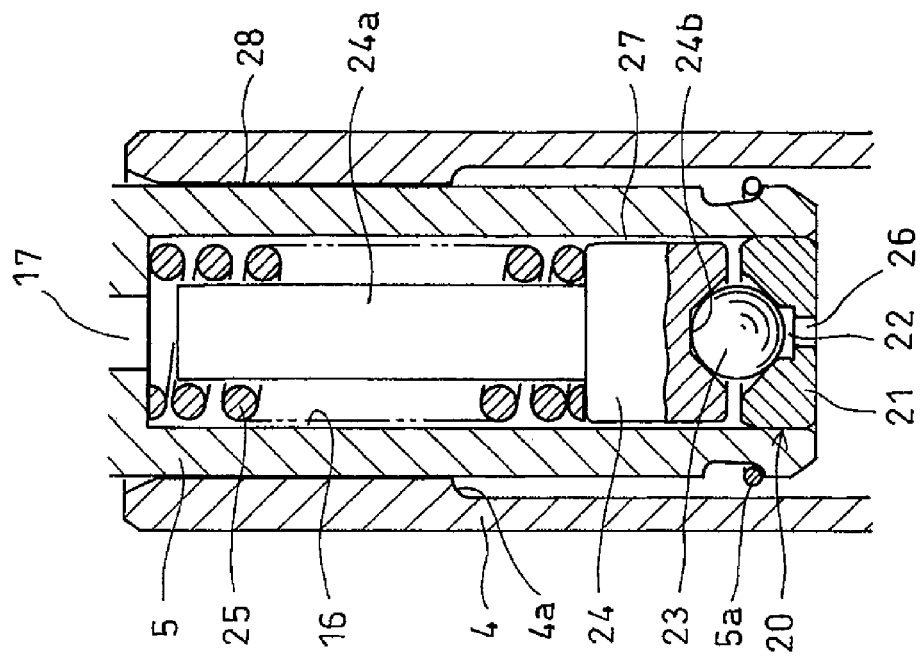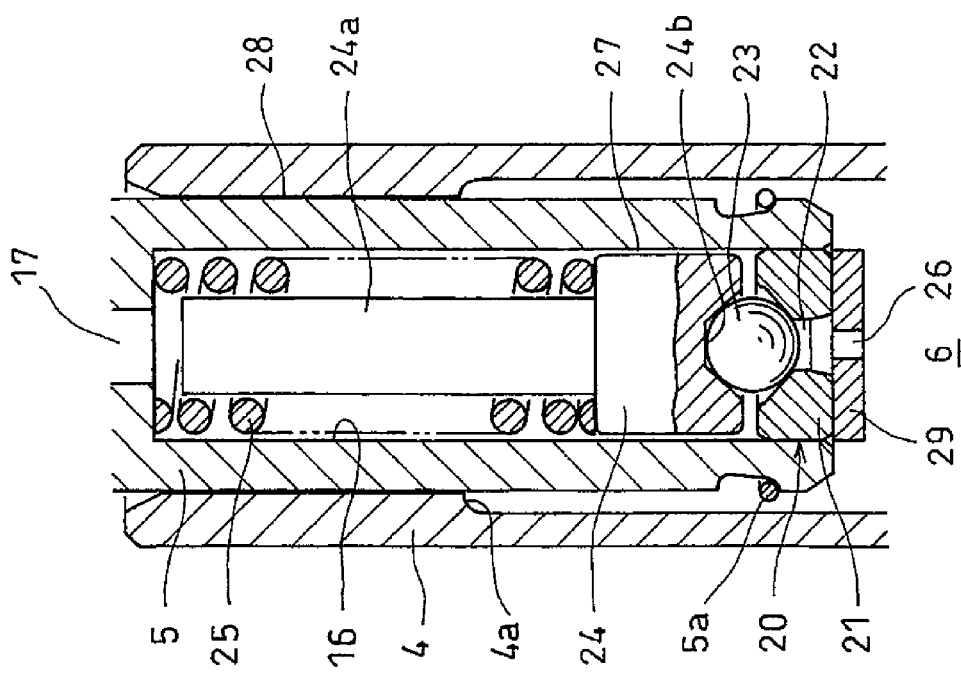

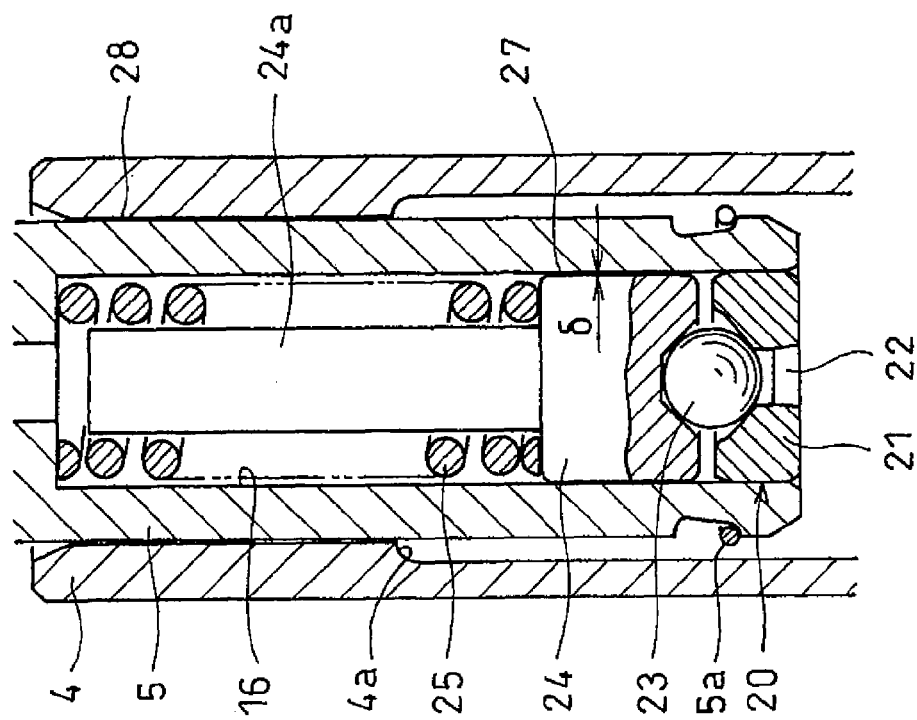
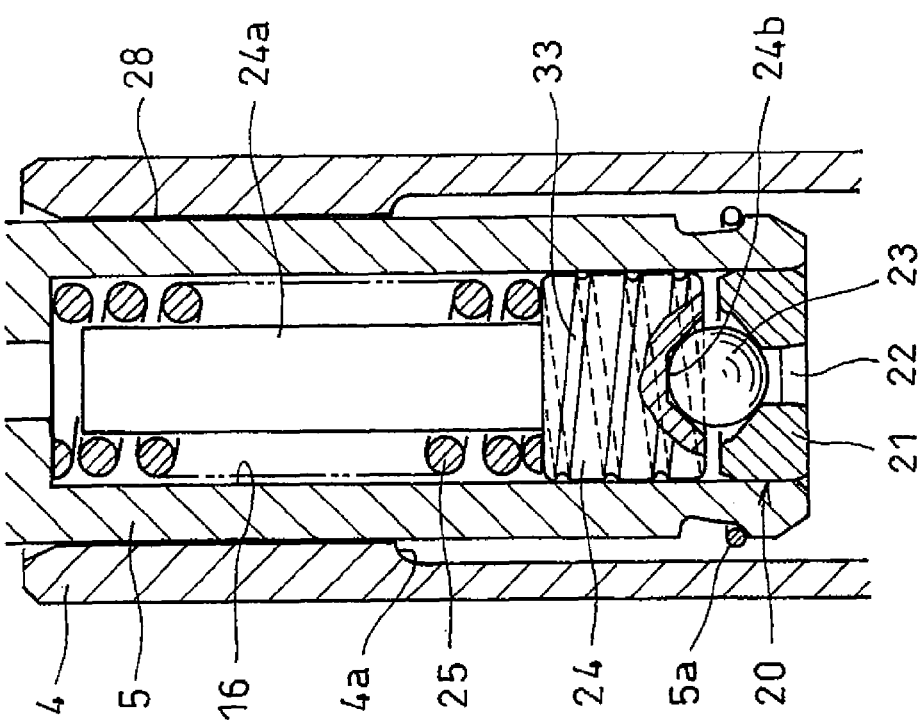

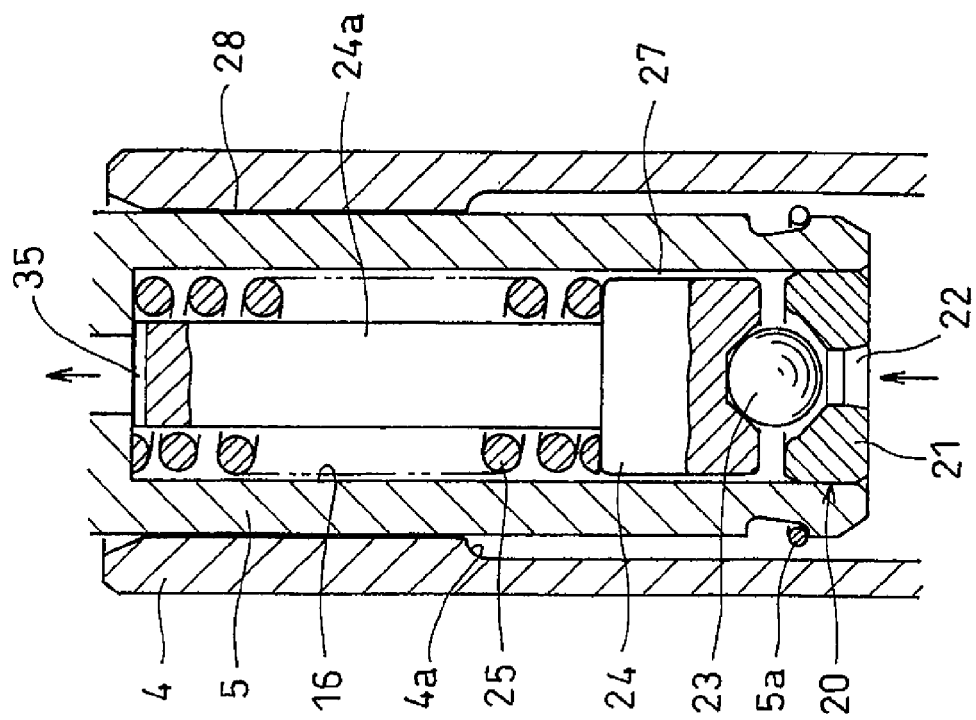
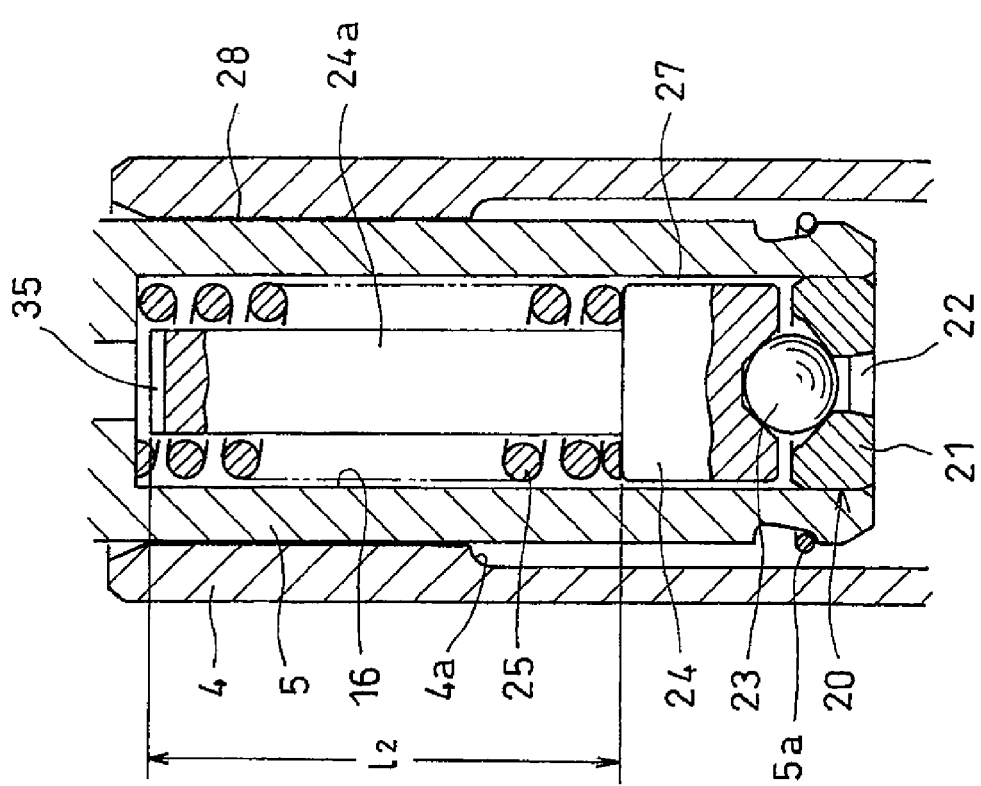

Test results for the ability to follow belt movement at low temperature, of the tensioner of the invention and comparative example Conditions: Ambient temperature −30° C
Frequency 50 Hz
Amplitude ±0.4 mm

HYDRAULIC AUTO-TENSIONER

TECHNICAL FIELD

This invention relates to a hydraulic auto-tensioner used to adjust the tension of a belt for driving automotive engine accessories such as an alternator, a water pump, or the compressor of an air-conditioner.

BACKGROUND ART

A belt transmission device for transmitting the rotation of an engine crankshaft to various engine accessories includes, as shown in FIG. 20, a pulley arm 63 provided on the slack side of a belt 61 so as to be pivotable about a pivot shaft 62, a tension pulley 64 rotatably mounted on the pulley arm 63 at its end opposite to the pivot shaft 62, and a hydraulic auto-tensioner A for applying an adjusting force to the pulley arm 63, thereby biasing the pulley arm 63 such that the tension pulley 64 is pressed against the belt 61, to keep constant the tension of the belt 61.

JP Patent Publication 2000-504395A discloses a hydraulic auto-tensioner A used in a belt transmission device of this type. This hydraulic auto-tensioner includes a cylinder having a bottom and containing oil, a sleeve extending vertically from the inner bottom surface of the cylinder, a rod having its lower portion slidably inserted in the sleeve, thus defining a pressure chamber in the sleeve, a spring seat provided at the upper portion of the rod, and a return spring mounted between the spring seat and the inner bottom surface of the cylinder and biasing the rod and the cylinder in the direction in which the rod protrudes from the cylinder.

This auto-tensioner further includes a bellows having its respective ends fitted on the outer periphery of the spring seat and the outer periphery of the cylinder at its upper portion, defining a closed reservoir chamber between the cylinder and the sleeve. The reservoir chamber has its lower portion in communication with the pressure chamber through an oil passage in which a check valve is provided. When a pushing force is applied to the hydraulic auto-tensioner A from the belt 61 through the tension pulley 64 and the pulley arm 63 that tends to push the rod into the cylinder, the check valve is adapted to close, thus causing oil in the pressure chamber to flow through a minute leakage gap defined between the radially inner surface of the sleeve and the radially outer surface of the rod. The pushing force is thus damped by hydraulic damping force produced in the pressure chamber due to viscous resistance of the oil flowing through the minute gap.

In this conventional arrangement, when a pushing force is applied to the rod from the belt 61, the pushing force pushes oil in the pressure chamber into the minute gap defined between the radially inner surface of the sleeve and the radially outer surface of the rod. The pushing force is thus damped by the hydraulic damping force produced in the pressure chamber due to viscous resistance of oil flowing through the leakage gap. The hydraulic damping force is thus substantially proportional to the pushing force. This means that the hydraulic damping force increases with an increase in the pushing force.

Thus, this tensioner cannot prevent over-tension of the belt and the resulting deterioration in durability of the belt.

To prevent this problem, JP Patent Publication 2009-191863A proposes to mount a relief valve in an oil passage defined in the rod through which the pressure chamber communicates with the reservoir chamber such that the relief valve opens if the pressure in the pressure chamber exceeds a set pressure, thereby releasing oil in the pressure chamber into the reservoir chamber through the oil passage. With this arrangement, the pressure in the pressure chamber never exceeds the set pressure of the relief valve, which prevents over-tension of the belt.

In the arrangement of the hydraulic auto-tensioner disclosed in JP Patent Publication 2009-191863A, if the relief valve opens, oil in the pressure chamber is instantly released into the reservoir chamber through the oil passage, resulting in a sudden drop in pressure in the pressure chamber. This makes it difficult for the auto-tensioner to reliably perform its hydraulic damping function.

When assembling the belt transmission device for driving engine accessories shown in FIG. 20, after mounting the hydraulic auto-tensioner in position and after mounting the tension pulley 64 on the pulley arm 63, if the hydraulic auto-tensioner disclosed in JP Patent Publication 2009-191863A is used in the belt transmission device of FIG. 20, since the rod and sleeve are biased by the return spring in the direction in which the rod protrudes from the sleeve, it is necessary to push the rod into the sleeve against the force of the return spring before stretching the belt around the tension pulley. Thus, it is difficult and troublesome to assemble the belt transmission device.

Typically, the oil used in a hydraulic auto-tensioner to produce hydraulic damping force contains a synthetic oil of polyalphaolefin and ester as its base oil. Such oil has a relatively high viscosity with a kinematic viscosity of 90 to 100 mm$^2$/second at 40° C. and 16 to 18 mm$^2$/second at 100° C.

If such oil is used in a hydraulic auto-tensioner, in order to keep small the damping load, the leakage gap is ordinarily adjusted to 20 to 60 μm, and the stroke of the valve ball for opening and closing the valve hole of the check valve is adjusted to about 0.2 to 0.3 mm.

In the hydraulic auto-tensioner disclosed in JP Patent Publication 2009-191863A, too, as with other ordinary hydraulic auto-tensioners, if relatively high-viscosity oil is used, and the leakage gap is adjusted to 20 to 60 μm to keep small the damping load, the stroke of the auto-tensioner tends to be large, so that a large amount of oil flows out into the reservoir chamber from the pressure chamber when the rod is pushed in.

If the stroke of the check ball between the open and closed positions is adjusted to 0.2 to 0.3 mm, the same amount of oil that has flowed out of the pressure chamber cannot smoothly flow back into the pressure chamber from the reservoir chamber when the rod protrudes, so that the amount of oil in the pressure chamber decreases. Especially at a low temperature, since the oil viscosity increases further, the amount of oil that flows into the pressure chamber decreases further, thus markedly reducing the damping load.

SUMMARY OF THE INVENTION

A first object of the present invention is to provide a hydraulic auto-tensioner including means for preventing a sharp and sudden drop in pressure in the pressure chamber, thereby preventing deterioration in hydraulic damper function.

A second object of the present invention is to provide a hydraulic auto-tensioner including means for preventing a further marked reduction in damping load while the damping load is low and the amplitude of the auto-tensioner is large at low temperature.

A third object of the present invention is to provide a hydraulic auto-tensioner including means that makes it possible to stretch a belt in position of which the tension is to be adjusted by the auto-tensioner.

In order to achieve the first object, the present invention provides a hydraulic auto-tensioner comprising a cylinder containing oil and having an inner bottom surface formed with a sleeve fitting hole, a sleeve having a bottom end portion fitted in the sleeve fitting hole, a tensioner rod having a bottom end portion slidably inserted in the sleeve to define a pressure chamber in the sleeve, a spring seat provided at an upper portion of the tensioner rod, a return spring mounted between the spring seat and the inner bottom surface of the cylinder and biasing the tensioner rod and the cylinder in a direction in which the tensioner rod protrudes from the cylinder, wherein at least one first oil passage is formed between fitting surfaces of the sleeve and the sleeve fitting hole such that the pressure chamber communicates with a reservoir chamber defined between the cylinder and the sleeve through the first oil passage, a check valve mounted in the first oil passage and configured to close the first oil passage when a pressure in the pressure chamber is higher than a pressure in the reservoir chamber, wherein the tensioner rod is formed with a valve fitting hole open to a bottom end surface of the tensioner rod, and a second oil passage through which an upper portion of the valve fitting hole communicates with the reservoir chamber, and a relief valve mounted in the valve fitting hole and configured to open if the pressure in the pressure chamber exceeds a set pressure, thereby releasing pressure in the pressure chamber into the reservoir chamber through the second oil passage, wherein the relief valve comprises a valve seat press-fitted in the valve fitting hole and formed with a valve hole, a valve ball mounted in the valve fitting hole at a position inwardly of the valve and configured to selectively open and close the valve hole, and a valve spring biasing the valve ball toward the valve hole, and wherein a restricted portion is provided in one of an oil inlet passage extending from the pressure chamber to the valve body of the relief valve and an oil outlet passage extending from the valve body to the second oil passage, wherein the restricted portion is configured to restrict an oil flow rate through the restricted portion.

By providing a restricted portion in one of the oil inlet passage extending from the pressure chamber to the valve body of the relief valve and the oil outlet passage extending from the valve body to the second oil passage, the restricted portion can restrict the oil flow rate when the relief valve opens. This prevents a sharp and sudden drop in pressure in the pressure chamber, thus preventing deterioration in hydraulic damper function.

The restricted portion may be an orifice formed at an oil inlet to the valve hole or at the oil inlet portion of the valve hole. In an alternative arrangement, the auto-tensioner includes a plate member mounted on the valve seat surface of the valve seat facing the pressure chamber and covering the valve hole, in which the restricted portion is a spiral groove formed in one of the valve seat surface and the plate member surface of the plate member facing the valve seat surface such that the pressure chamber communicates with the valve hole through the spiral groove. Further alternatively, the restricted portion may be pores of a porous member mounted on the surface of the valve seat facing the pressure chamber and covering the valve hole.

The above-mentioned orifice may be formed in the valve seat or in an orifice plate mounted on the surface of the valve seat facing the pressure chamber.

If the diameter of the orifice is too large, due to a large difference in pressure between the inlet and outlet of the relief valve, the pressure in the pressure chamber tends to drop sharply and suddenly. On the other hand, it is difficult to form an orifice having an unnecessarily small diameter. Taking both these factors into consideration, the diameter of the orifice is determined within the range of 0.1 to 1.0 mm.

The restricted portion is not limited to the above-described orifice, spiral groove, and pores of a porous member. For example, in an alternative arrangement, the relief valve includes a circular spring seat mounted between the valve body and the valve spring so as to be slidable along the radially inner surface of the valve fitting hole, in which the restricted portion is a minute leakage gap defined between the sliding surfaces of the spring seat of the relief valve and the valve fitting hole.

In a further alternative arrangement, the relief valve includes a circular valve spring seat mounted between the valve body and the valve spring so as to be slidable along the radially inner surface of the valve fitting hole, in which the restricted portion is a helical groove formed in the radially outer surface of the spring seat of the relief valve.

In a still further alternative arrangement, the relief valve further includes a valve rod formed on the top surface of the valve spring seat so as to be received in the valve spring, in which the valve rod has an axial length determined such that when the valve body of the relief valve is in the open position, the top end surface of the valve rod abuts a top end wall of the valve fitting hole, and in which the restricted portion is a groove formed in the top end surface of the valve rod.

In order to achieve the second object, the present invention provides an auto-tensioner of the above-described type in which a leakage gap of 15 to 45 μm is defined between the sliding surfaces of the sleeve and the rod, in which the stroke of the check ball of the check valve between the open and closed positions is 0.4 to 1.0 mm, and in which the oil is low-viscosity oil having a kinematic viscosity of 20 to 50 mm$^2$/second at 40° C. and 5 to 10 mm$^2$/second at 100° C.

By using low-viscosity oil having a kinematic viscosity of 20 to 50 mm$^2$/second at 40° C. and 5 to 10 mm$^2$/second at 100° C., if the leakage gap between the sliding surfaces of the sleeve and the rod is adjusted to 15 to 45 μm, the leak down time increases, so that it is possible to set the damping load to a small value. By setting the leakage gap to such a small value, the rod can be stably supported in the sleeve, so that it is possible to prevent the rod from markedly inclining relative to the sleeve when the rod protrudes from or is pushed into the sleeve. This allows the rod to be smoothly pushed into and out of the sleeve with fluctuations in the tension of the belt.

With the damping load set at a small value as described above, if the stroke of the check ball between the open and closed positions is small, while the amplitude of the auto-tensioner is large, so that a large amount of oil flows from the pressure chamber into the reservoir chamber, the amount of oil that returns from the reservoir chamber into the pressure chamber tends to be insufficient. Especially at low temperature, where the oil viscosity is high, the amount of oil flowing into the pressure chamber tends to be especially small, which results in a further reduction in damping load. But by setting the stroke of the check ball between the open and closed positions within the range of 0.4 to 1.0 mm, oil can smoothly flow from the reservoir chamber into the pressure chamber, thus preventing shortage of oil in the pressure chamber.

Thus, even at low temperature, with the damping load set at a small value, it is possible to prevent a further reduction in damping load. Thus, the hydraulic auto-tensioner according to the present invention can smoothly follow the movement of an engine accessory driving belt.

In order to solve the third object, the present invention provides a hydraulic auto-tensioner of the above-described type which further includes a ring-shaped retaining ring configured to be stretched around the auto-tensioner so as to engage the undersurface of the cylinder and the top surface of the spring seat, thereby keeping the rod pushed in the sleeve.

By stretching the retaining belt around the tensioner so as to engage the undersurface of the cylinder and the top surface of the spring seat, it is possible to keep the auto-tensioner in a contracted state. With this arrangement, since the force of the return spring is not being applied to the pulley arm when the hydraulic auto-tensioner is mounted in position by coupling one end of the auto-tensioner to the pulley arm of the belt transmission device and the other end to the engine block, it is not necessary to keep applying a pushing force to the auto-tensioner to keep the tensioner contracted when stretching the belt around the various pulleys. Thus, the belt can be easily mounted in position.

After stretching the belt in position, the retaining belt is cut with a cutting tool, allowing the rod to protrude from the sleeve under the force of the return spring until suitable tension is applied to the belt through the pulley arm.

According to the present invention, by the provision of the restricted portion in one of the oil inlet passage extending from the pressure chamber to the valve body of the relief valve and the oil outlet passage extending from the valve body to the second oil passage, the restricted portion can restrict the oil flow rate when the relief valve opens. This prevents a sharp and sudden drop in pressure in the pressure chamber, thus preventing deterioration in hydraulic damper function.

BRIEF DESCRIPTION OF THE DRAWINGS

FIG. 2 is an enlarged sectional view of a portion of the auto-tensioner of FIG. 1 where a relief valve is mounted.

FIG. 3 is a sectional view of an auto-tensioner having a different orifice.

FIG. 6 is a sectional view of an auto-tensioner having a still different restricted portion.

FIG. 7 is a sectional view of an auto-tensioner having a stilldifferent restricted portion.

FIG. 8A is a sectional view of an auto-tensioner having a still different restricted portion; and FIG. 8B shows the state where the restricted portion is formed.

DETAILED DESCRIPTION OF THE INVENTION

Figure 1:
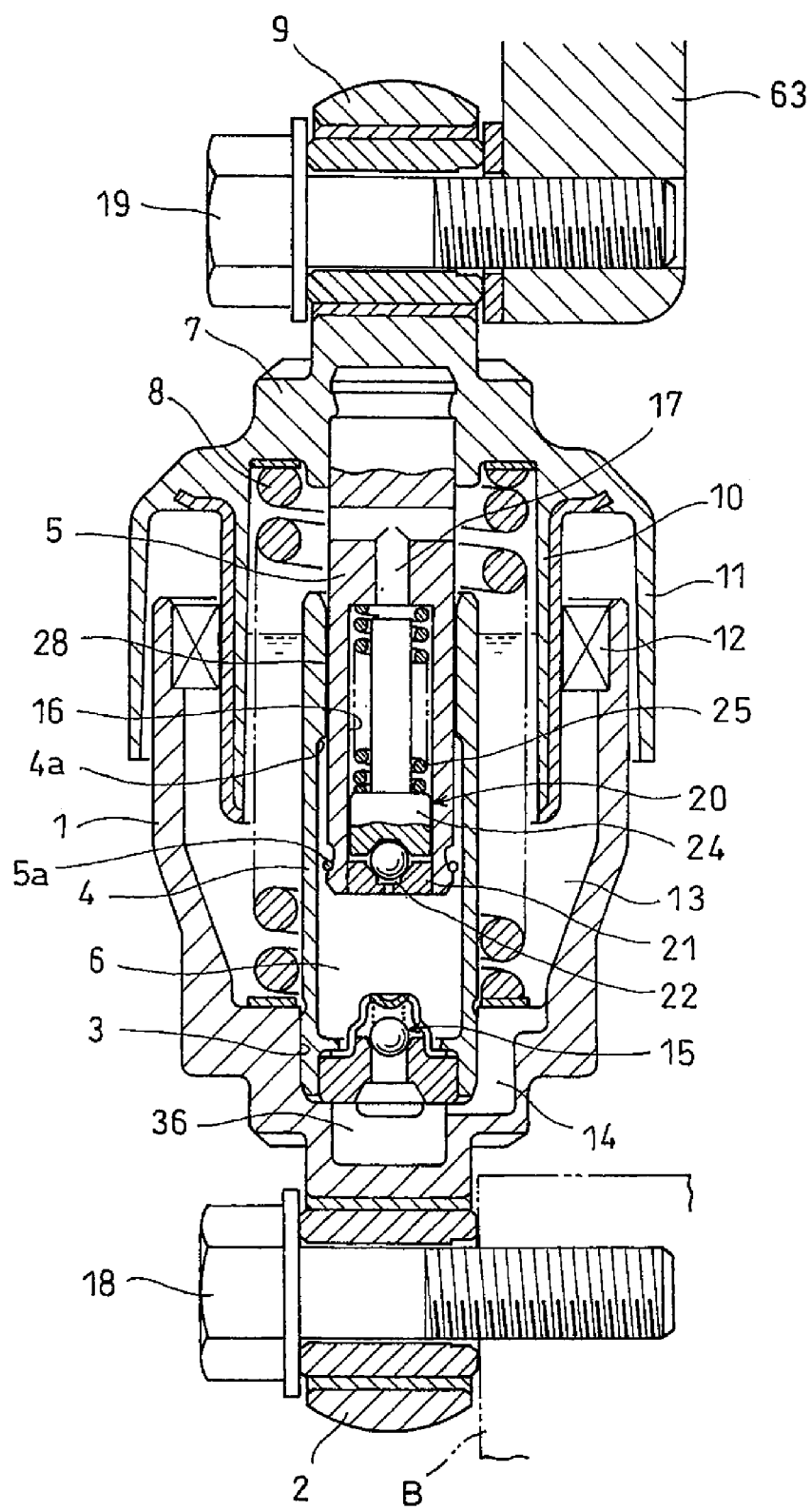
FIG. 1 is a vertical sectional front view of a hydraulic auto-tensioner embodying the present invention.

Now the embodiment of the present invention is described with reference to the drawings. As shown in FIG. 1, the auto-tensioner includes a cylinder 1 having a closed bottom at which a coupling piece 2 is provided configured to be rotatably coupled to an engine block.

A sleeve fitting hole 3 is formed in the inner bottom surface of the cylinder 1. A sleeve 4 has its bottom end press-fitted in the sleeve fitting hole 3. A rod 5 has its lower portion slidably inserted in the sleeve 4. The portion of the rod 5 inserted in the sleeve 4 defines a pressure chamber 6 in the sleeve 4.

A spring seat 7 is fixed to the top end of the rod 5, which is located outside of the cylinder 1. A return spring 8 is mounted between the spring seat 7 and the inner bottom surface of the cylinder 1 to bias the cylinder 1 and the rod 5 in a direction in which the rod 5 protrudes from the cylinder 1.

A snap ring 5a is mounted to the bottom end of the rod 5, which is located inside of the sleeve 4. A shoulder 4a is formed on the inner periphery of the sleeve 4 at its upper portion so as to vertically face the snap ring 5a. The snap ring 5a and the shoulder 4a are arranged such that when the snap ring 5a abuts the shoulder 4a, the rod 5 cannot move vertically upwardly relative to the sleeve 4, thus preventing the rod 5 from completely coming out of the sleeve 4 from its top opening.

Figure 20:
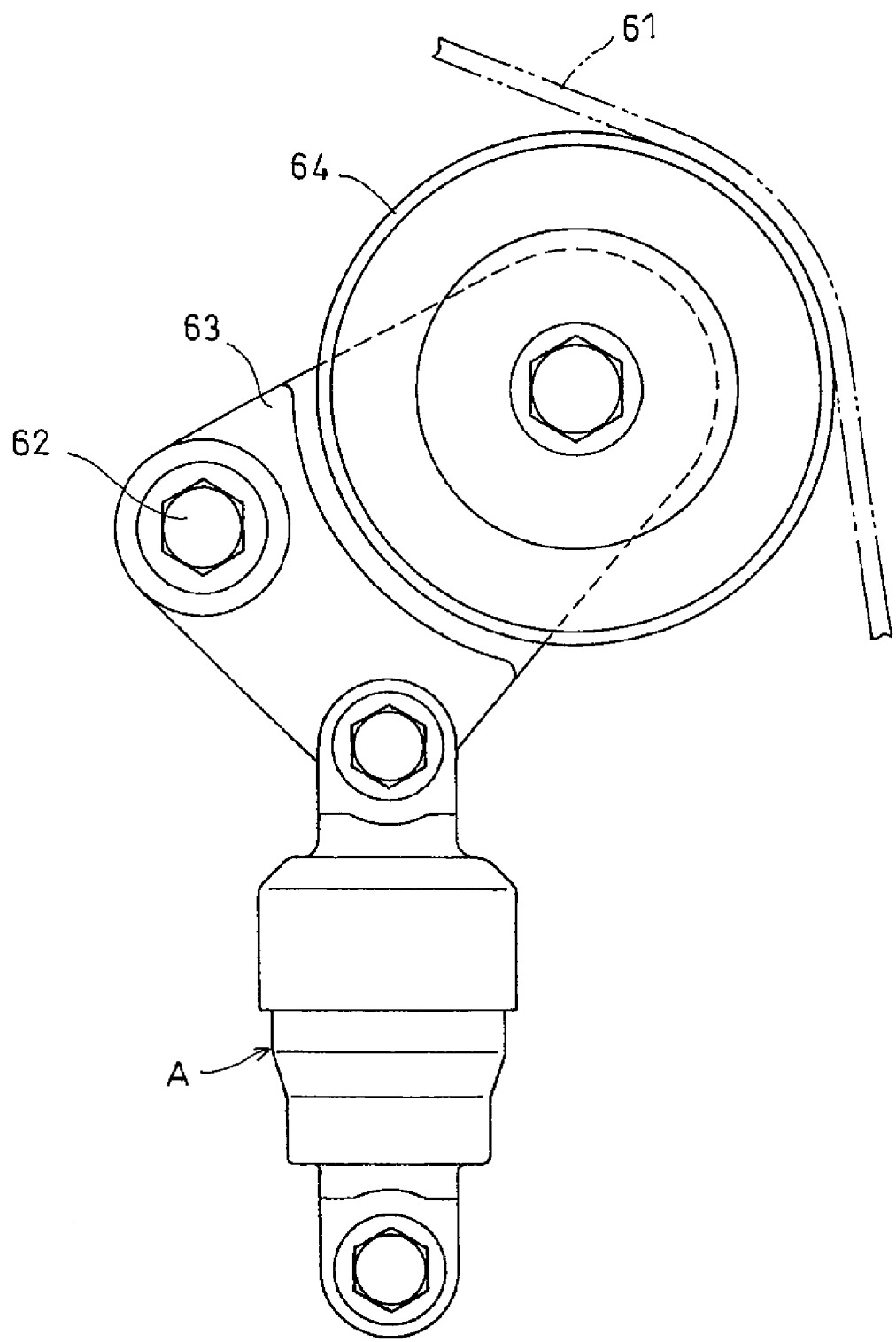
FIG. 20 is a front view of a tension adjusting device for an engine accessory driving belt.

A coupling piece 9 is provided on the top end of the spring seat 7 which is configured to be coupled to a pulley arm 63 shown in FIG. 20. The spring seat 7 includes an inner tube 10 covering the upper portion of the return spring 8, and an outer tube 11 coaxial with the inner tube 10 and covering the outer periphery of the cylinder 1 at the upper portion of the cylinder 1.

An elastic seal 12 such as an oil seal is mounted in the top opening of the cylinder 1 with the inner periphery of the elastic seal 12 in elastic contact with the outer periphery of the inner tube 10, closing the top opening of the cylinder 1, thereby preventing leakage of oil in the cylinder 1.

The elastic seal 12 defines a closed reservoir chamber 13 between the cylinder 1 and the sleeve 4. The reservoir chamber 13 communicates with the pressure chamber 6 through oil passages 14 defined between the sleeve fitting hole 3 and the surface of the portion of the sleeve 4 fitted in the sleeve fitting hole 3, and an oil reservoir 36 or a circular recess formed in the center of the bottom surface of the sleeve fitting hole 3.

Each oil passage 14 includes an axial groove portion 14a, a radial groove portion 14b radially inwardly extending from the bottom of the axial groove portion 14a to the oil reservoir 36. The axial groove portion 14a has a radially outwardly elongated top opening 14c.

In the embodiment, four such oil passages 14 are provided, forming a cross as viewed from top. But the number of oil passages 14 is not limited provided it is at least two.

Figure 9:
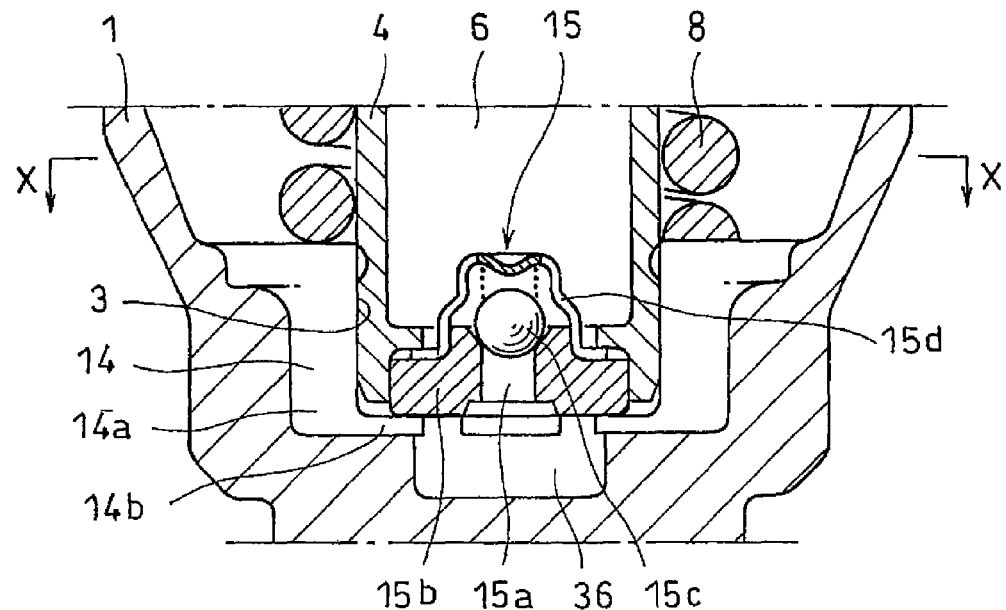
FIG. 9 is an enlarged sectional view of a portion of the auto-tensioner where a check valve is mounted.
Figure 10:
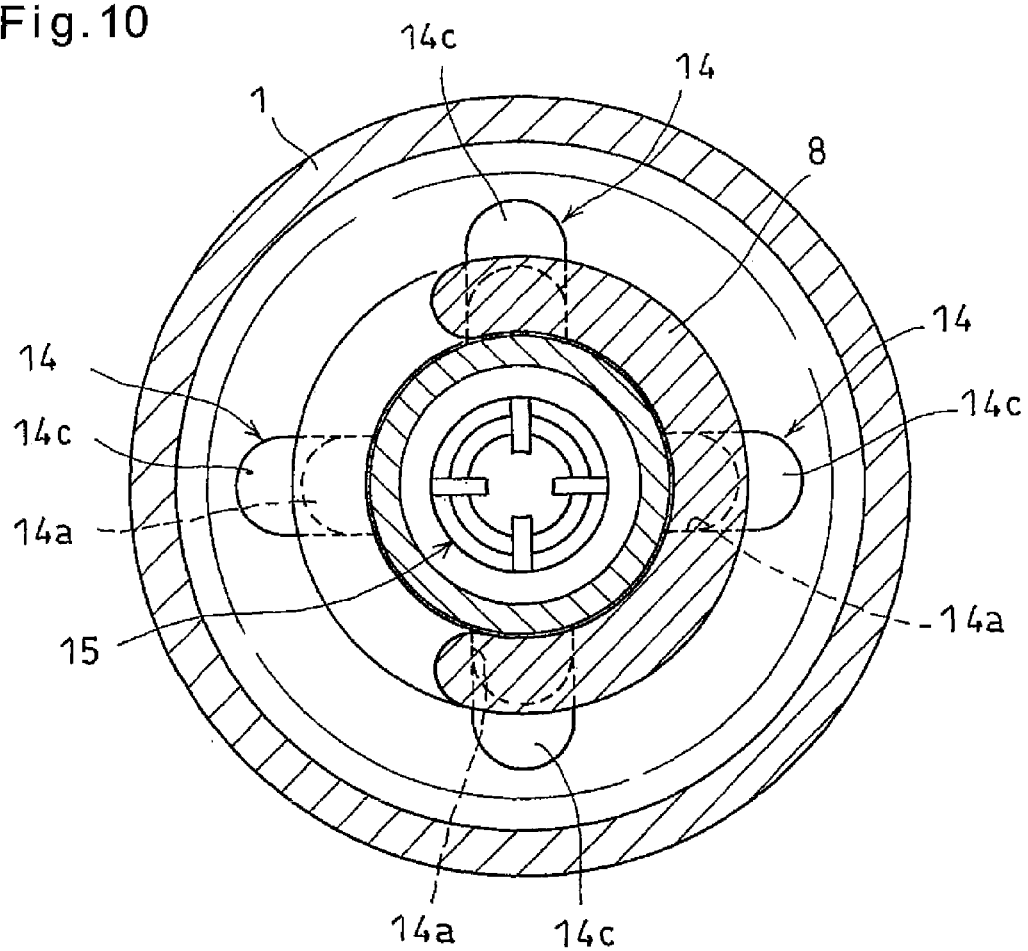
FIG. 10 is a sectional view taken along line X-X of FIG. 9.
Figure 11:
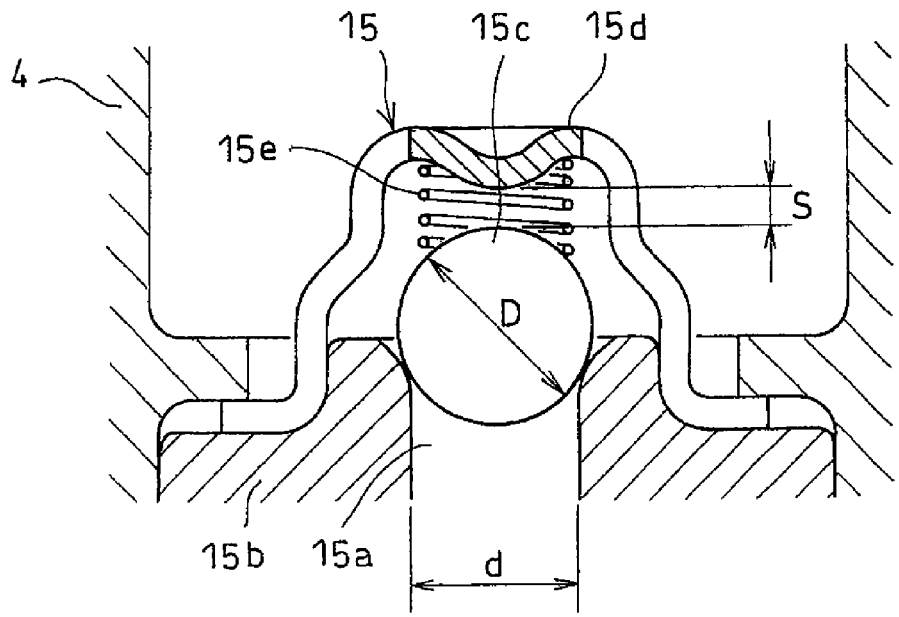
FIG. 11 is an enlarged sectional view of the check valve of FIG. 9.

As shown in FIG. 9, a check valve 15 is mounted in the sleeve 4 at its bottom end portion. As shown in FIG. 11, the check valve 15 includes a valve seat 15b having a valve hole 15a, a check ball 15c which opens and closes the valve hole 15a of the valve seat 15b from inside the pressure chamber 6, a valve retainer 15d which restricts the degree of opening of the valve hole 15a by the check ball 15c, and a valve spring 15e biasing the check ball 15c toward the valve hole 15a. The check valve 15 is configured such that when the pressure in the pressure chamber 6 exceeds the pressure in the reservoir chamber 13, the check ball 15c closes the valve hole 15a, closing communication between the pressure chamber 6 and the oil passages 14, and thus preventing oil in the pressure chamber 6 from flowing into the reservoir chamber 13 through the oil passages 14.

As shown in FIG. 1, the rod 5 is formed with a valve fitting hole 16 open at the bottom end surface of the rod 5, and a T-shaped oil passage 17 through which the top of the valve fitting hole 16 communicates with the reservoir chamber 13. A relief valve 20 is mounted in the valve fitting hole 16.

As shown in FIG. 2, the relief valve 20 includes a valve seat 21 press-fitted in the bottom opening of the valve fitting hole 16, a spherical valve body 23 for opening and closing the valve hole 22 from inside the valve fitting hole 16, a spring seat 24 provided above the valve body 23, and a valve spring 25 biasing the valve body 23 toward the valve hole 22 through the spring seat 24.

The relief valve 20 is configured such that if the pressure in the pressure chamber 6 exceeds a set pressure which is the elastic force of the valve spring 25, the valve hole 22 is opened by the valve body 23. The valve hole 22 has an orifice 26 or a flow restricting portion at its bottom end. The orifice 26 has a diameter of 0.1 to 1.0 mm.

The spring seat 24 is a circular member which is slidable along the radially inner surface of the valve fitting hole 16 with a leakage gap 27 defined between the spring seat 24 and the valve fitting hole 16.

A rod 24a is integrally provided on the top surface of the spring seat 24 so as to be located in the valve spring 25. A conical recess 24b is formed in the undersurface of the spring seat 24 in which the upper portion of the valve body 23 is received.

In order to adjust the tension of the engine accessory driving belt 61 shown in FIG. 20 with the hydraulic autotensioner of the embodiment, as shown in FIG. 1, the coupling piece 2 provided at the closed end of the cylinder 1 is pivotally coupled to the engine block B by means of a bolt which serves as a pivot shaft 18, while the coupling piece 9 of the spring seat 7 is coupled to the pulley arm 63 by means of a coupling shaft 19 in the form of a bolt, thereby applying an adjusting force to the pulley arm 63.

In this state, when the tension of the belt 61 decreases due to fluctuations in loads applied to an engine accessory, the return spring 8 pushes the cylinder 1 and the rod 5 in the direction in which the rod 5 protrudes from the cylinder 1, thereby removing slackness of the belt 61.

When the cylinder 1 and the rod 5 are moved relative to each other in the direction in which the rod 5 protrudes from the cylinder 1, the pressure in the pressure chamber 6 decreases below the pressure in the reservoir chamber 13. This causes the check valve 15 to open the oil passages 14, so that oil in the reservoir chamber 13 flows smoothly into the pressure chamber 6 through the oil passages 14. This allows the cylinder 1 and the rod 5 to quickly move relative to each other in the direction in which the rod 5 protrudes from the cylinder 1, thus quickly removing slackness of the belt 61.

When the tension of the belt 61 increases, a pushing force is applied to the rod 5 which tends to push the rod 5 into the cylinder 1. The pushing force increases the pressure in the pressure chamber 6 higher than the pressure in the reservoir chamber 13, causing the check valve 15 to close the oil passages 14.

Oil in the pressure chamber 6 flows through a narrow leakage gap 28 defined between the radially inner surface of the sleeve 4 and the radially outer surface of the rod 5 and then flows into the reservoir chamber 13. The viscous resistance of oil flowing through the leakage gap 28 produces a hydraulic damper force in the pressure chamber 6 which dampens the pushing force applied to the autotensioner, allowing the cylinder 1 and the rod 5 to slowly move relative to each other in the direction in which the rod 5 is pushed into the cylinder 1 until the pushing force balances with the force of the return spring 8.

When the tension of the belt 61 increases to a level where the pressure in the pressure chamber 6 exceeds the set pressure of the relief valve 20, the relief valve 20 opens, allowing oil in the pressure chamber 6 to be released into the reservoir chamber 13 through the oil passage 17. Thus the pressure in the pressure chamber 6 is kept at the set pressure of the relief valve 20 or below.

When the relief valve 20 opens, if a large amount of oil in the pressure chamber 6 is released instantly into the reservoir chamber 13, the pressure in the pressure chamber 6 drops sharply, thus deteriorating the hydraulic damper function. But in the embodiment, the orifice 26 provided at the bottom end portion of the valve hole 22 restricts the amount of oil that passes through the valve hole 22, thus preventing a sharp drop in pressure in the pressure chamber 6 and thus deterioration in the hydraulic damper function.

In FIG. 2, the valve seat 21 is provided with the orifice 26. In FIG. 3, the orifice 26 is formed in an orifice plate 29 mounted to the undersurface of the valve seat 21, which faces the pressure chamber 6.

In FIGS. 2 and 3, the orifice 26 is used as the flow restricting portion. But the flow restricting portion is not limited to an orifice. FIGS. 4 to 9 show flow restricting portions which are not orifices.

Figure 4A:
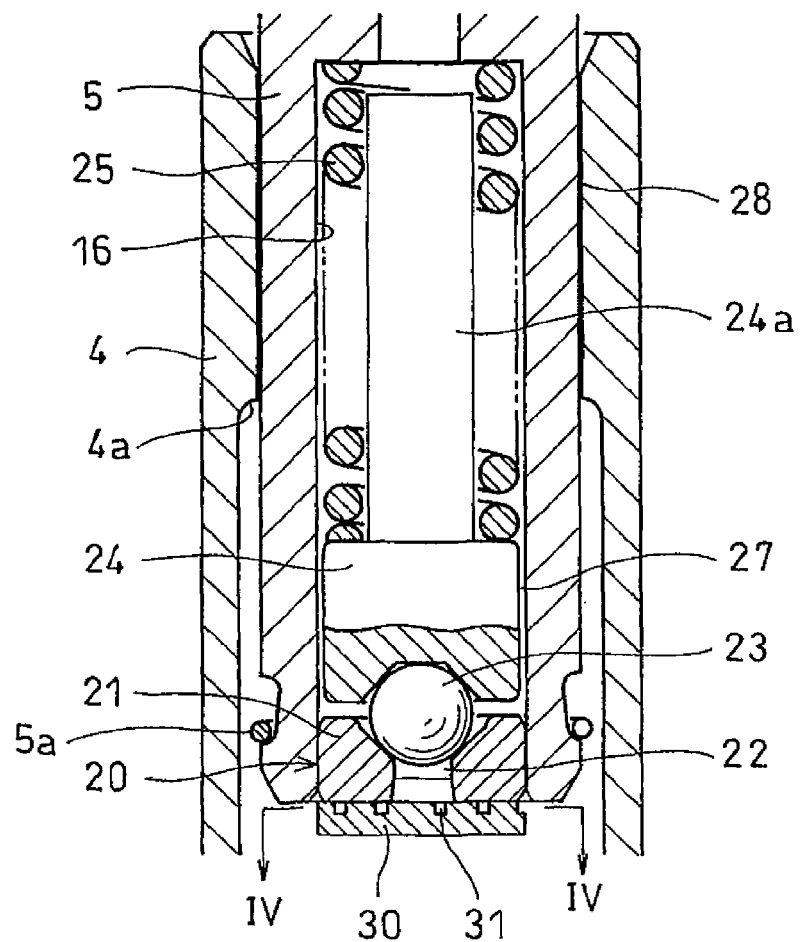
FIG. 4A is a sectional view of an auto-tensioner having a different restricted portion.
Figure 4B:
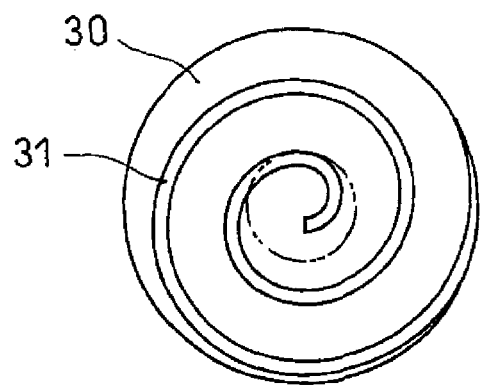
FIG. 4B is a sectional view taken along line IV-IV of FIG. 4A.

In the embodiment of FIGS. 4A and 4B, a plate member 30 is mounted to the undersurface of the valve seat 21, which faces the pressure chamber 6, so as to cover the valve hole 22. A spiral groove 31 as the flow restricting portion is formed in the top surface of the plate member 30, which is in abutment with the undersurface of the valve seat 21. But instead, the spiral groove may be formed in the undersurface of the valve seat 21.

Figure 5:
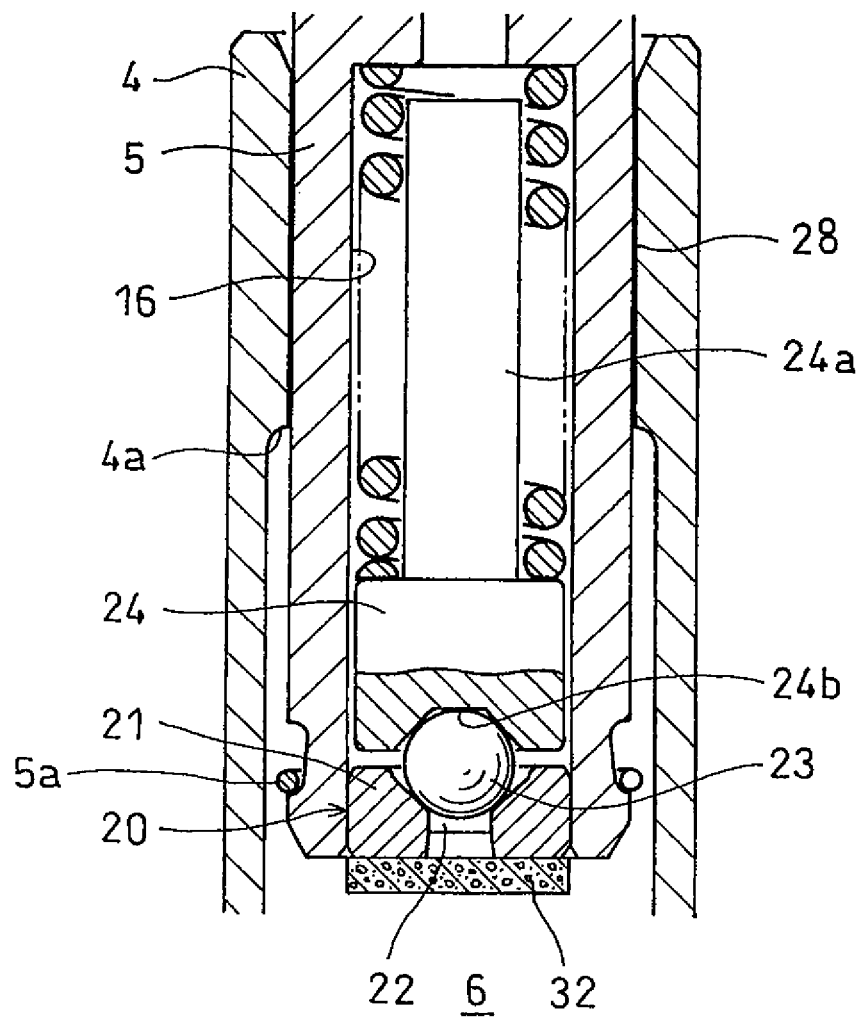
FIG. 5 is a sectional view of an auto-tensioner having a still different restricted portion.

In the embodiment of FIG. 5, the flow restricting portion is in the form of the pores of a porous member 32 mounted to the undersurface of the valve seat 21, which faces the pressure chamber 6.

In the embodiment of FIG. 6, the leakage gap 27 defined between the sliding surfaces of the spring seat 24 and the valve fitting hole 16 of the rod 5 is used as the flow restricting portion. For this purpose, the radial dimension δ of the leakage gap 27 is reduced to 10 to 50 μm.

In FIG. 7, as the flow restricting portion, a helical groove 33 is formed in the radially outer surface of the circular spring seat 24, which is slidable along the radially inner surface of the valve fitting hole 16.

In FIGS. 8A and 8B, the rod 24a, which is integrally provided on the top surface of the spring seat 24, has an axial length 12 determined such that the top end of the rod 24a abuts the closed top end surface of the valve fitting hole 16 when the valve body 23 of the relief valve 20 is in the open position shown in FIG. 8B. As the flow restricting portion, a groove 35 is formed in the top end surface of the rod 24a.

The stroke of the valve body 23 between its open and closed positions is determined to be 0.25 to 1.00 mm. The groove 35 is a diametrical groove in FIGS. 8A and 8B. But the groove 35 may not be a diametrical groove. For example, it may be a cross-shaped groove.

The flow restricting portion of any of the embodiments of FIGS. 4 to 8 can prevent a sharp drop in pressure in the pressure chamber 6.

In any of the embodiments, the check valve 15, shown in FIG. 11, is dimensioned as follows: diameter d of the valve hole 15a formed in the valve seat 15b: 2.5 to 3.0 mm; and diameter D of the check ball 15c: 3.0 to 3.5 mm. The stroke S of the check ball 15c between the open and closed positions is determined at 0.4 to 1.0 mm.

Oil used is low-viscosity oil containing as the base oil a synthetic oil of polyalphaolefin and ester and having a kinematic viscosity of 20 to 50 mm$^2$/second at 40° C. and 5 to 10 mm$^2$/second at 100° C.

In view of the viscosity of this low-viscosity oil, the leakage gap 28 defined between the sliding surfaces of the sleeve 4 and the rod 5 is determined at 15 to 45 μm. By setting the size of the leakage gap 28 within this range while using the above low-viscosity oil, the leak down time of this auto-tensioner is substantially the same as in a conventional auto-tensioner in which high-viscosity oil is used with the leakage gap set at 20 to 60 μm. The damping load is thus low.

With this arrangement, since the leakage gap 28 is small, the rod 5 can be stably supported by the sleeve 4 such that when the rod 5 protrudes from or is pushed into the sleeve 4, the rod 5 is less likely to incline relative to the sleeve 4. The rod 5 can thus smoothly protrude from and be pushed into the sleeve with fluctuations in tension of the belt.

Since the damping load is low, the amplitude of the auto-tensioner is large and thus a large amount of oil flows from the pressure chamber 6 into the reservoir chamber 13. Thus, if the stroke of the check ball 15c between the open and closed positions is small, no sufficient amount of oil can flow back into the pressure chamber 6 from the reservoir chamber 13. Especially at a low temperature, since the oil viscosity increases further, the amount of oil that flows into the pressure chamber decreases further, thus markedly reducing the damping load. But according to this embodiment, since the stroke of the check ball 15c is adjusted to 0.4 to 1.0 mm, a sufficient amount of oil can smoothly flow into the pressure chamber 6 from the reservoir chamber 13.

Thus, when the damping load is low and thus the amplitude of the auto-tensioner is large, even at a low temperature, the damping load does not markedly decrease. Thus when the hydraulic auto-tensioner of this embodiment is used for a belt for driving engine accessories, it can smoothly follow the movement of the belt even at low temperature.

An auto-tensioner according to the present invention and a comparative example as shown in Table 1 were tested for the ability to follow the movement of the belt at low temperature. The results of the test are shown in FIG. 12.

TABLE 1

|  | Present invention | Comparative example |
| --- | --- | --- |
| Oil viscosity | Kinematic viscosity at 40° C.: 35 mm$^2$/s Kinematic viscosity at 100° C.: 7.5 mm$^2$/s | Kinematic viscosity at 40° C.: 90 mm$^2$/s Kinematic viscosity at 100° C.: 17 mm$^2$/s |
| Leakage gap | 45 μm | 60 μm |
| Amount of oil | 40% of internal space volume | 40% of internal space volume |
| Stroke of check ball | 0.6 mm | 0.3 mm |

Figure 12:
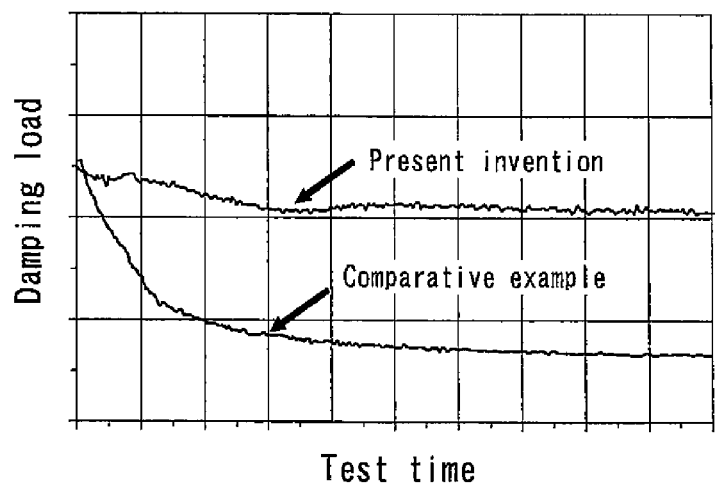
FIG. 12 is a graph showing the results of a test of followability of the auto-tensioner of the invention and a comparative auto-tensioner at low temperature.

FIG. 12 also shows the test conditions.

As is apparent from the test results, in the auto-tensioner according to the present invention, the damping load scarcely decreases at low temperature while its amplitude is large.

When the rod 5 protrudes from the sleeve 4 until the snap ring 5a abuts the shoulder 4a, the rod 5 cannot protrude from the sleeve 4 any further. The axial length of the inner tube 10 is determined such that with the snap ring 5a in abutment with the shoulder 4a, the bottom end portion of the inner tube 10 horizontally overlaps with the top end portion of the sleeve 4. With this arrangement, whenever the rod 5 is pushed into the sleeve 4, oil in the pressure chamber 6 flows through the leakage gap 28 and overflows the top edge of the sleeve 4 into the space defined by the inner tube 10. But the inner tube 10 prevents oil from reaching the elastic seal 12, thus smoothly returning oil leaked out of the pressure chamber 6 into the reservoir chamber 13.

Figure 13:
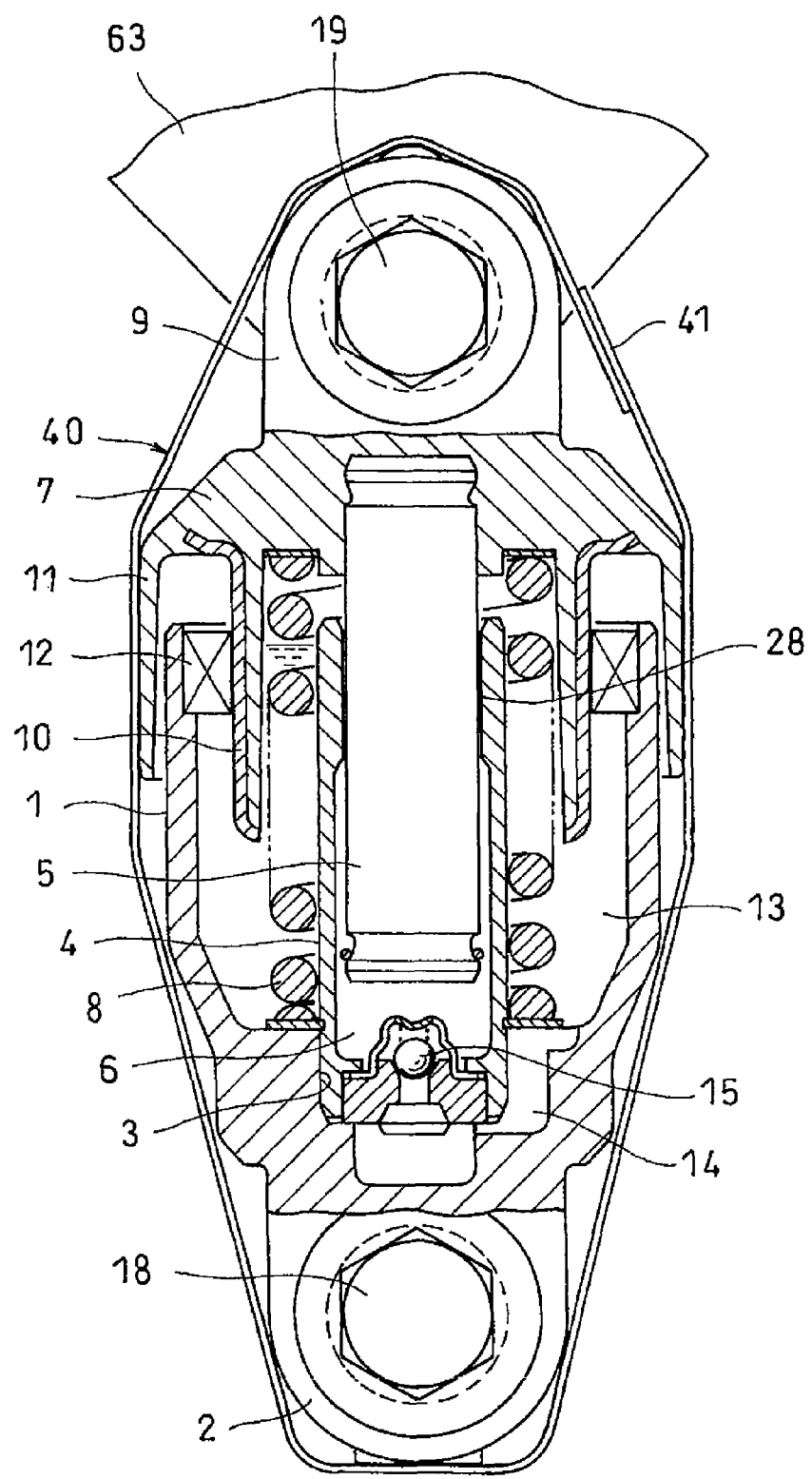
FIG. 13 is a sectional view of the hydraulic auto-tensioner when the auto-tensioner is contracted by a retaining belt.

FIG. 13 shows a hydraulic auto-tensioner according to another embodiment of the present invention. The auto-tensioner of this embodiment includes a ring-shaped retaining belt 40 which can be stretched around the coupling pieces 2 and 9, which are provided on the bottom surface of the cylinder 1 and the top surface of the spring seat 7, respectively, thereby keeping the rod 5 pushed in the sleeve 4 against the force of the return spring 8.

With the hydraulic auto-tensioner contracted by the retaining belt 40, the coupling piece 9 is coupled to the pulley arm 63 shown in FIG. 20 by means of a coupling shaft 19, and the coupling piece 2 at the bottom end of the cylinder 1 is rotatably supported on the engine block B by means of the pivot shaft 18. In this state, since the force of the return spring 8 of the auto-tensioner is not being applied to the pulley arm 63, it is not necessary to keep applying a pushing force to the auto-tensioner to keep the rod retracted in the cylinder. Thus, the belt 61 can be easily mounted in position.

Figure 14:
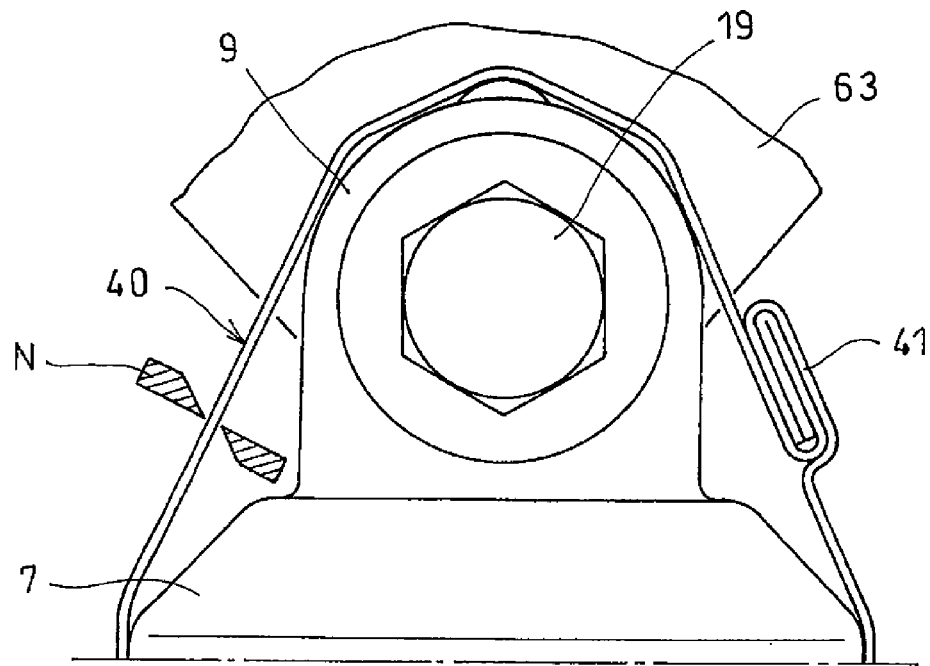
FIG. 14 shows a retaining belt whose ends are connected together in a different manner.

After mounting the belt 61 in position, the retaining belt 40 is cut by a cutting tool N such as a nipper as shown in FIG. 14 to allow the rod 5 to protrude from the sleeve 4 under the force of the return spring 8, thereby pressing the pulley arm 63 and applying a tension adjusting force to the belt 61.

Figure 17:
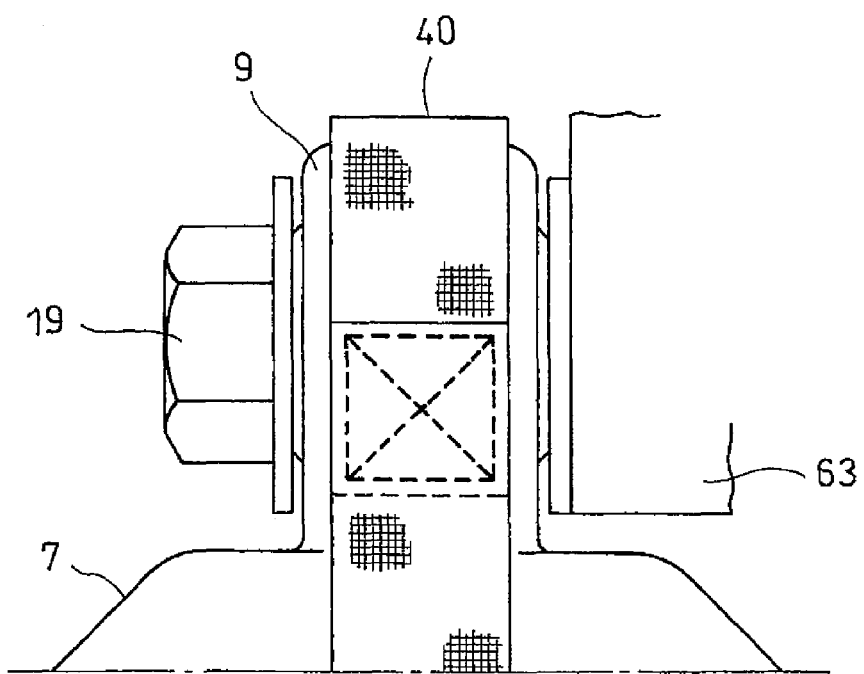
FIG. 17 shows a different retaining belt.
Figure 18:
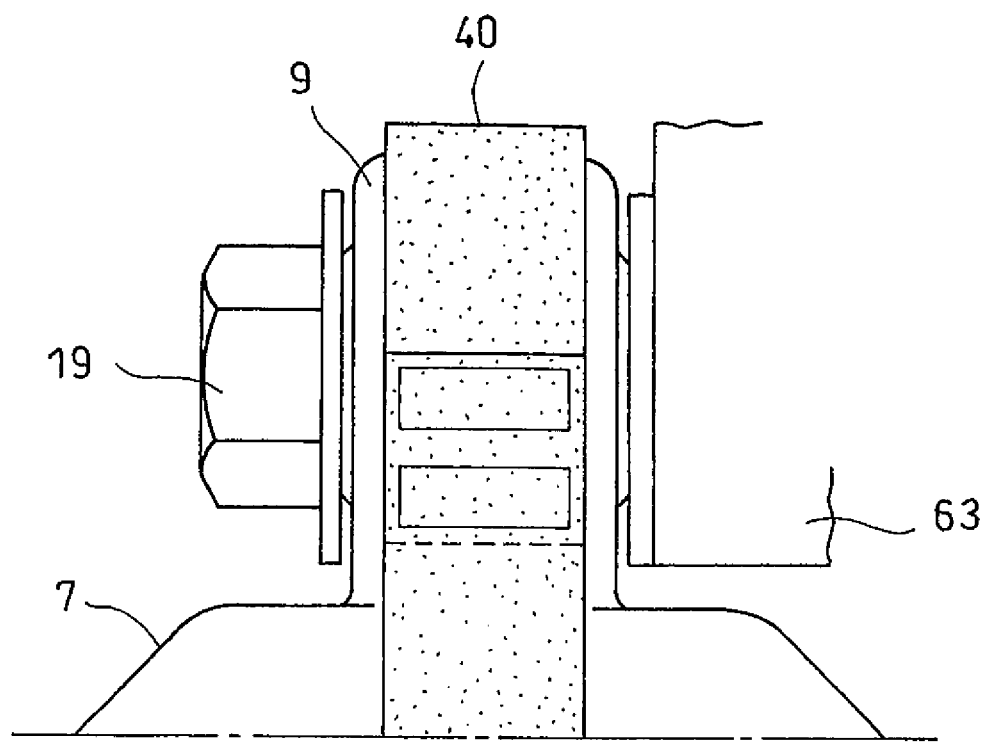
FIG. 18 shows a still different retaining belt.
Figure 19:
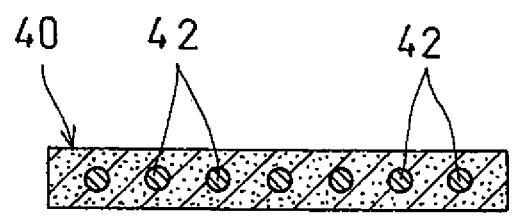
FIG. 19 shows a still different retaining belt.

The ring-shaped retaining belt 40 is not particularly limited as long as it can keep the rod of the auto-tensioner retracted against the force of the return spring 8. The retaining belts 40 shown in FIGS. 13 to 16 are made of metal such as steel or aluminum. The retaining belt 40 shown in FIG. 17 is formed from a fabric of synthetic fiber or aramid fiber. The retaining belt 40 shown in FIG. 18 is made of rubber. If the retaining belt 40 is made of rubber, it is preferably reinforced with core wires 42 made of synthetic resin, as shown in FIG. 19.

If the retaining belt 40 is made of a metal, its longitudinal end portions should be connected together with the longitudinal end portions overlapping each other as shown at 41 in FIGS. 13 and 14. In FIG. 13, the ends of the metal belt 40 are connected together by spot welding. In FIG. 14, the ends of the metal belt 40 are connected together by bending the overlapping ends.

Figure 15:
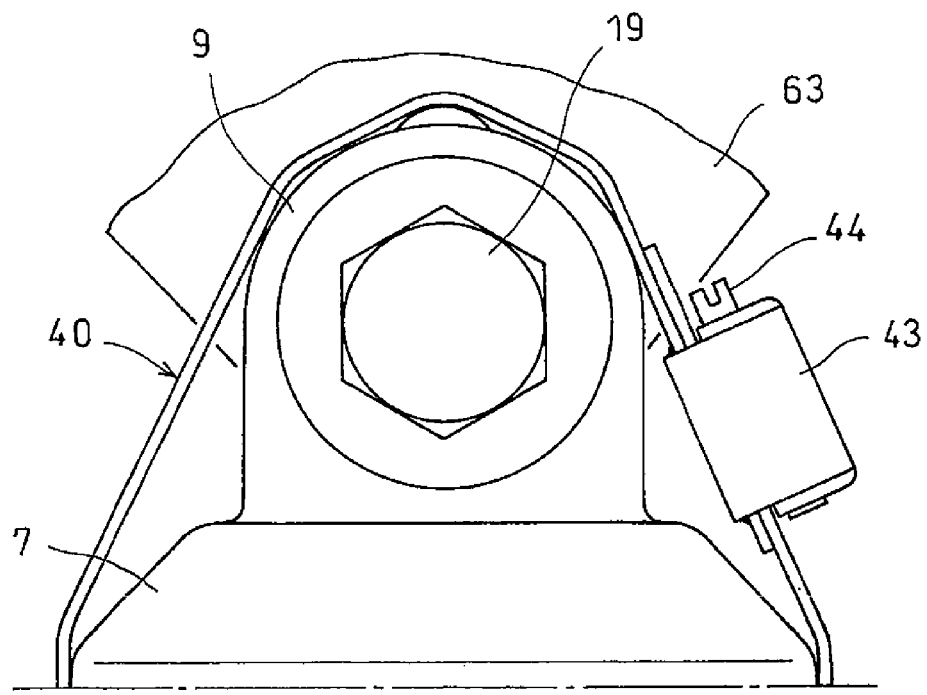
FIG. 15 shows a retaining belt whose ends are connected together in a still different manner.
Figure 16:
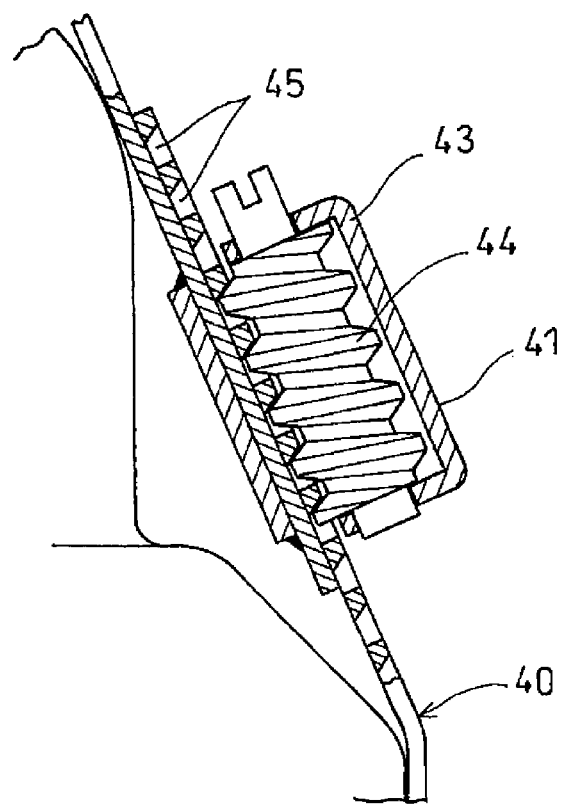
FIG. 16 is a sectional view of FIG. 15.

As shown in FIGS. 15 and 16, the retaining belt 40 may include a screw case 43 mounted at one longitudinal end thereof, an adjusting screw 44 rotatably supported by the screw case 43, and a plurality of longitudinally spaced apart slots 45 formed at the other longitudinal end of the belt 40. By engaging the adjusting screw 44 with some of the slots 45, the longitudinal ends of the belt 40 are connected together. By turning the screw 44 in this state, it is possible to adjust the circumferential length of the ring portion of the belt 40. Since this belt 40 can be disengaged from the auto-tensioner after mounting the belt 61 in position, without the need to cut it, this belt is reusable.

If the retaining belt 40 is made of metal, the belt may be bent beforehand in compliance the outer peripheral shape of the hydraulic auto-tensioner, as shown in FIG. 13.

What is claimed is:

1. A hydraulic auto-tensioner for an engine accessory, the auto-tensioner comprising:
    a cylinder containing oil and having an inner bottom surface formed with a sleeve fitting hole;
    a sleeve having a bottom end portion fitted in the sleeve fitting hole;
    a rod having a bottom end portion slidably inserted in the sleeve to define a pressure chamber in the sleeve;
    a spring seat provided at an upper portion of the rod;
    a return spring mounted between the spring seat and the inner bottom surface of the cylinder and biasing the rod and the cylinder in a direction in which the rod protrudes from the cylinder;
    an inner tube fixed to the spring seat, and covering an upper portion of the return spring;
    an elastic seal mounted in a top opening of the cylinder, and kept in elastic contact with an outer periphery of the inner tube, thereby preventing leakage of oil in the cylinder;
    an oil passage formed between fitting surfaces of the sleeve and the sleeve fitting hole such that the pressure chamber communicates with a reservoir chamber defined between the cylinder and the sleeve through the oil passage; and
    a check valve mounted at the bottom end portion of the sleeve, and configured to close communication between the pressure chamber and the oil passage when a pressure in the pressure chamber is higher than a pressure in the reservoir chamber,
    wherein the check valve comprises a valve seat formed with a valve hole, a check ball mounted in the pressure chamber and configured to selectively open and close the valve hole of the valve seat, and a valve retainer for restricting a movement of the check ball between open and closed positions of the check ball,
    wherein a stroke of the check ball between the open and closed positions is 0.4 mm to 1.0 mm,
    wherein a leakage gap of 15 µm to 45 µm is defined between sliding surfaces of the sleeve and the rod,
    wherein the oil is low-viscosity oil having a kinematic viscosity of 20 mm$^2$/second to 50 mm$^2$/second at 40° C. and 5 mm$^2$/second to 10 mm$^2$/second at 100° C.,
    wherein the valve hole of the valve seat has a diameter of 2.5 mm to 3.0 mm, and
    wherein the check ball has a diameter of 3.0 mm to 3.5 mm.

2. The hydraulic auto-tensioner according to claim 1, wherein the oil contains a base oil comprising a synthetic oil of polyalphaolefin and ester.

3. The hydraulic auto-tensioner according to claim 2, wherein when the rod protrudes from the sleeve to a maximum degree so as not to be able to protrude from the sleeve any further, the inner tube has an axial length determined such that a bottom end portion of the inner tube horizontally overlaps with a top end portion of the sleeve.

4. The hydraulic auto-tensioner according to claim 3, wherein the oil passage is a first oil passage of a plurality of oil passages having top openings having areas, and wherein the sum of the areas is at least twice a cross-sectional area of the valve hole of the valve seat.

5. The hydraulic auto-tensioner according to claim 3, wherein the content of the oil is at least 40% of a volume of an internal space of the auto-tensioner when the rod protrudes from the sleeve to a maximum degree.

6. The hydraulic auto-tensioner according to claim 2, wherein the check valve further comprises a valve spring biasing the check ball toward the valve hole.

7. The hydraulic auto-tensioner according to claim 2, wherein the oil passage is a first oil passage of a plurality of oil passages having top openings having areas, and wherein the sum of the areas is at least twice a cross-sectional area of the valve hole of the valve seat.

8. The hydraulic auto-tensioner according to claim 2, wherein the content of the oil is at least 40% of a volume of an internal space of the auto-tensioner when the rod protrudes from the sleeve to a maximum degree.

9. The hydraulic auto-tensioner according to claim 1, wherein when the rod protrudes from the sleeve to a maximum degree so as not to be able to protrude from the sleeve any further, the inner tube has an axial length determined such that a bottom end portion of the inner tube horizontally overlaps with a top end portion of the sleeve.

10. The hydraulic auto-tensioner according to claim 9, wherein the check valve further comprises a valve spring biasing the check ball toward the valve hole.

11. The hydraulic auto-tensioner according to claim 9, wherein the oil passage is a first oil passage of a plurality of oil passages having top openings having areas, and wherein the sum of the areas is at least twice a cross-sectional area of the valve hole of the valve seat.

12. The hydraulic auto-tensioner according to claim 9, wherein the content of the oil is at least 40% of a volume of an internal space of the auto-tensioner when the rod protrudes from the sleeve to a maximum degree.

13. The hydraulic auto-tensioner according to claim 1, wherein the check valve further comprises a valve spring biasing the check ball toward the valve hole.

14. The hydraulic auto-tensioner according to claim 13, wherein the content of the oil is at least 40% of a volume of an internal space of the auto-tensioner when the rod protrudes from the sleeve to a maximum degree.

15. The hydraulic auto-tensioner according to claim 1, wherein the oil passage comprises a first oil passage of a plurality of oil passages having top openings having areas, and wherein the sum of the areas is at least twice a cross-sectional area of the valve hole of the valve seat.

16. The hydraulic auto-tensioner according to claim 1, wherein the content of the oil is at least 40% of a volume of an internal space of the auto-tensioner when the rod protrudes from the sleeve to a maximum degree.

* * * * *